(12) United States Patent  
Allen

(10) Patent No.: US 7,346,796 B1  
(45) Date of Patent: Mar. 18, 2008

(54) STREAMING OUTPUT PERIPHERALS FOR PROGRAMMABLE CHIP SYSTEMS

(75) Inventor: Tim Allen, Santa Cruz, CA (US)

(73) Assignee: Altera Corporation, San Jose, CA (US)

( * ) Notice: Subject to any disclaimer, the term of this patent is extended or adjusted under 35 U.S.C. 154(b) by 427 days.

(21) Appl. No.: 10/749,857

(22) Filed: Dec. 30, 2003

(51) Int. Cl.  
*G06F 1/04* (2006.01)

(52) U.S. Cl. ...................... 713/500; 700/245

(58) Field of Classification Search .......... 713/500; 700/245  
See application file for complete search history.

(56) References Cited

U.S. PATENT DOCUMENTS

| | | | | |
|---|---|---|---|---|
| 4,396,987 A | * | 8/1983 | Inaba et al. .................. 700/249 |
| 4,543,639 A | * | 9/1985 | Inaba et al. .................. 700/249 |
| 4,549,276 A | * | 10/1985 | Inaba et al. .................. 700/253 |
| 5,764,968 A | * | 6/1998 | Ninomiya .................... 713/601 |
| 5,903,747 A | * | 5/1999 | Casal .......................... 713/501 |
| 6,085,309 A | * | 7/2000 | Okamura ...................... 712/35 |
| 6,188,255 B1 | * | 2/2001 | Mann ........................... 327/113 |
| 2003/0125897 A1 | * | 7/2003 | Higashide .................... 702/118 |

OTHER PUBLICATIONS

DsPIC® Digital Signal Controllers, 16-bit Microcontrollers, website www.microchip.com, Dec. 1, 2004, 1-3 pages.  
PICmicro® Microcontrollers, 8-bit Microcontrollers, website www.microchip.com, Dec. 1, 2004, 1-3 pages.  
Microchip dsPIC30F014, dsPIC30F4013 Data Sheet, High Performance Digital Signal Controllers, Advance Information, © Microchip Technology Inc.212 pages.  
Motorola TPU Reference Manual TPURM/AD 199067 pages.

* cited by examiner

*Primary Examiner*—Chun Cao  
(74) *Attorney, Agent, or Firm*—Beyer Weaver LLP

(57) ABSTRACT

Methods and apparatus are provided for configuring and generating a sequence of discrete output signal values. A microcontroller writes output signal values to memory and provides address and timing information to a streaming output peripheral. The streaming output peripheral uses the address and timing information to read output signals values from memory and provide the output signal values in a clock cycle accurate manner.

25 Claims, 8 Drawing Sheets

| Address 501 | Data 503 |
|---|---|
| 0x0000 | 0x023F |
| 0x0001 | 0x0839 |
| 0x0002 | 0xF2A3 |
| 0x0003 | 0x011F |
| 0x0004 | 0x0162D |

Figure 5B

| Address 551 | Data 553 |
|---|---|
| 0x0000 | 0x023F |
| 0x0001 | 0x0002 |
| 0x0002 | 0xF2A3 |
| 0x0003 | 0x0008 |
| 0x0004 | 0x0162D |

STREAMING OUTPUT PERIPHERALS FOR PROGRAMMABLE CHIP SYSTEMS

BACKGROUND OF THE INVENTION

1. Field of the Invention

The present invention relates to the generation discrete output values, such as digital or analog waveforms. More specifically, the present invention relates to methods and apparatus for generating generator clock cycle accurate output values using a streaming output device on a programmable chip.

2. Description of Related Art

Conventional microcontroller systems often include real-time waveform generation peripherals, allowing a user to configure the systems to produce cycle accurate waveforms. Microcontroller systems with real-time waveform generation capabilities are often used in applications such as automotive and industrial control applications. The waveform generator peripherals range from basic pulse width modulators (PWM) to more complex devices such as Time Processing Units (TPUs).

Conventional waveform generation peripherals have a variety of drawbacks. Some peripherals have minimal functionality and can only generate simple, predetermined waveforms. Other peripherals are more complex. However, the more complex peripherals are extremely difficult to configure. It is often very difficult to get the most out of a device such as a TPU without developing substantial expertise. Furthermore, many conventional devices use internal state machines and counters to create pulse and edge sequences. Using internal state machines and counters intrinsically limits the complexity of the sequences that can be generated.

Conventional mechanisms for generating output signals such as waveforms are limited. Consequently, it is therefore desirable to provide improved methods and apparatus for configuring and generating output signals associated with a microcontroller system. In one example, it is desirable to provide an architecture allowing the efficient and effective configuration of a streaming output device.

SUMMARY OF THE INVENTION

Methods and apparatus are provided for configuring and generating a sequence of discrete output signal values. A microcontroller writes output signal values to memory and provides address and timing information to a streaming output peripheral. The streaming output peripheral uses the address and timing information to read output signals values from memory and provide the output signal values in a clock cycle accurate manner.

In one embodiment, a system on a programmable chip is provided. The system includes a memory, a processor, and a streaming output peripheral. The processor is coupled to memory on the programmable chip. The processor is operable to write streaming output information to memory. The streaming output peripheral is configured to generate clock cycle accurate output signals. The clock cycle accurate output signals are generated by reading streaming output information from memory and outputting signals based on the streaming output information.

In another embodiment, a method for generating a waveform is provided. Streaming output information is read from memory. The streaming output information is written to memory by a processor core on a programmable chip. Clock cycle accurate output signals are generated at a streaming output peripheral. The clock cycle accurate output signals are generated at the streaming output peripheral by reading streaming output information from memory and outputting signals based on the streaming output information.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

FIGS. 5A-5B are diagrammatic representations showing streaming output signal description information.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of particular processor components.

However, it should be noted that the techniques of the present invention can be applied to a variety of processor units. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
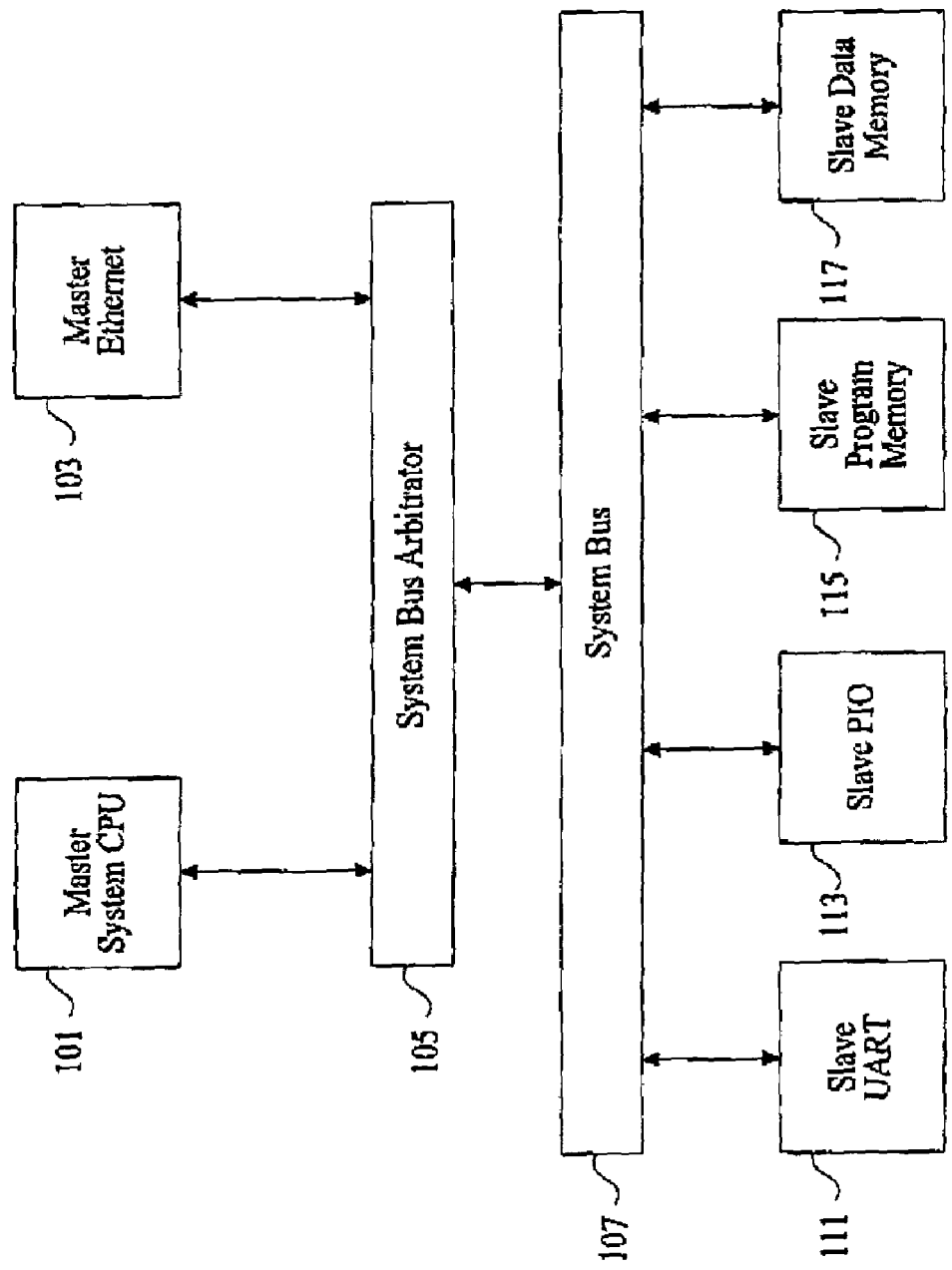
FIG. 1 is a diagrammatic representation showing a system with a waveform generator.

Microcontroller systems are used in a variety of control applications, such as automotive and industrial control applications. A microcontroller system typically includes some waveform generation capability in order to provide extremely accurate time-control over output sequences. FIG. 1 is a diagrammatic representation showing a microcontroller system including waveform generator. The microcontroller system includes system microcontroller 101 and a waveform generator 103 as well as peripheral components UART 111, PIO 113, program memory 115, and data memory 117.

In some examples, the microcontroller 101 and the waveform generator 103 may be the same component. Any microprocessor used to control entities such as machinery, appliances, tools, other system components, or robotic equipment is referred to herein as a microcontroller.

The waveform generators range from simple pulse width modulators (PWM) to more complex Time Processing Units (TPU), available from Motorola Corporation of Schaumburg, Ill. In one example, a waveform generator produces a sequence of pulses in order to drive a robotic arm at precise time intervals. The waveform generators can effectively drive many control applications. However, waveform generators such as the Motorola TPU are notoriously complex and difficult to use. In conventional implementations, programmers configure peripherals like the TPU to generate "complex" edge accurate waveforms. The TPU and similar devices would use internal state machines and counters to create pulse and edge sequences that are cycle accurate. Any generated waveform accurately time-controlled is referred to herein as a cycle accurate waveform or a clock cycle accurate waveform.

However, using state machines and counters intrinsically limits the complexity of the sequences that can be generated. In addition, the complexity of a TPU and similar devices makes it very difficult to generate even simple waveforms using the device without developing substantial expertise.

System processors and microcontrollers can also be used to generate relatively generalized waveforms. However, microcontrollers can not generate clock cycle accurate waveforms. In one example, an interrupt or a processor stall can prevent a processor from outputting a signal at precisely the right clock cycle. Although processors can effectively generate generalized waveforms that are not clock cycle accurate, processors have difficulty generating time precise waveforms.

Consequently, the techniques and mechanisms of the present invention provide a streaming output device with waveform generation capabilities. Any logic or mechanism providing a sequence of discrete output values at cycle accurate times is referred to herein as a streaming output device. Output samples are provided at accurately controlled times. According to various embodiments, output sequences can be of arbitrary length and complexity and device logic is simple and compact. An output stream can be a digital logic (vector) value, a digital to analog converter (DAC) sample, a pulse width modulator (PWM) sample, or any other signal that can be represented using values.

Instead of using mechanisms such as state machines or counters to generate output signals, signal values are stored in memory buffers, allowing extremely complex sequences of values to be generated. In one example, the system microcontroller or microprocessor is used to fill memory buffers with signal values and activates the streaming output device. The streaming output device automatically "scans out" the values at specific times. The device includes internal logic providing cycle-accuracy without microprocessor intervention.

Figure 2:
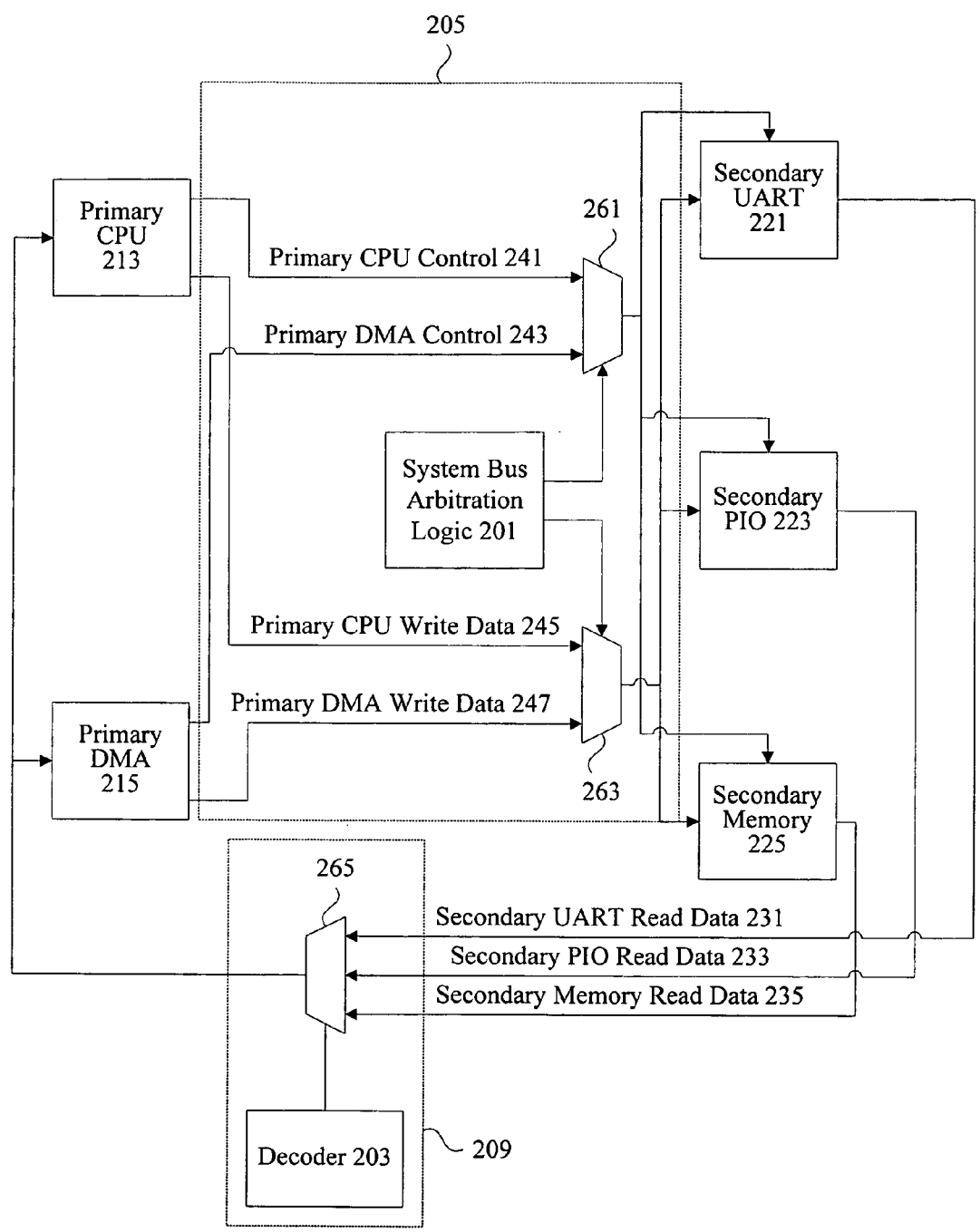
FIG. 2 is a diagrammatic representation showing a system using a conventional bus.

FIG. 2 is a diagrammatic representation depicting a streaming output device coupled to a microprocessor in a system using a conventional bus architecture. The techniques and mechanisms of the present invention recognize that an efficient streaming output device can be implemented in a system using a conventional bus architecture, even though such an architecture is not ideal. For example, a conventional bus architecture would have a streaming output device and a processor competing for bus resources. The lack of bus resources may make it difficult for a streaming output device to scan out values from memory in a clock cycle accurate manner.

A conventional bus architecture includes a system bus arbitrator 205. A system bus arbitrator 205 includes arbitrator switching circuitry 261 and 263 as well as system bus arbitration logic 201. Logic and mechanisms for selecting an input based on a control signal are referred to herein as arbitrator switching circuitry. It should be noted that although switching circuitry generally can be implemented using multiplexers, a variety of mechanisms including switches and transistors can be used.

Any component or device that is operable to initiate read and write operations by providing control information is referred to herein as a primary component. Primary components are sometimes referred to as master components. Control information can include a particular address associated with a secondary component. Any component or device that responds to read or write operations with information sent back to the primary component regarding the read or write operation is referred to herein as a secondary component. Secondary components are sometimes referred to as slave components. Some examples of primary components are processors, microcontrollers, streaming I/O devices, and Ethernet devices. Some examples of secondary components are Universal Asynchronous Receiver Transmitters (UARTs), Parallel Input Output (PIO), program memory, and data memory. It should be noted that some components such as an Ethernet component can be both a primary component and a secondary component, as an Ethernet component has the capability of reading and writing to the secondary program memory while also responding to instructions from primary system CPU. Similarly, a component such as a streaming output generator can also be both a primary and a secondary component, as it can read memory while receiving requests from a microcontroller.

Logic and mechanisms for providing the control signal based on criteria such as fairness or priority are referred to herein as arbitration logic. The inputs of the arbitrator switching circuitry 261 and 263 are connected to primary CPU 213 and primary DMA 215. In one example, a streaming output device is also included as a primary component and secondary component. In one example, a streaming output device is a streaming input/output device. The outputs of the arbitrator switching circuitry 261 and 263 are connected to secondary UART 221, secondary PIO 223, and secondary memory 225. The outputs of the secondary components transmit information such as read data back to the primary components through a decoder 209. Mechanisms for selecting secondary components and translating control information such as addresses is referred to herein as a decoder. In conventional computer systems, there is a single decoder for each bus. A decoder 209 includes decoder logic 203 and decoder switching circuitry 265 for selecting the particular secondary component data transfer. A decoder can also be referred to as a primary side arbitrator including primary side arbitration logic and primary side switching circuitry.

A system bus typically has a set width (e.g. 64 bits, 128 bits) and allows only one primary component to actively use the bus at any one time. In conventional systems, only one primary component can access any one of the given secondary components and any given time. A primary component performing a read or write operation on a secondary component is referred to herein as accessing a secondary component. Multiple primary components accessing multiple primary components in a manner that would cause data bit collisions if performed on the same data lines is referred to herein as accessing secondary components at the same time.

In one example, a primary system CPU is accessing a secondary PIO. While the primary system CPU is accessing the secondary PIO, a streaming output device can not access a system memory even if both the primary streaming output device and the system memory are available.

The system bus arbitration logic 201 determines which primary component has access to the system bus at any time. The system bus arbitrator 201 can determine which primary component can access a secondary component based on criteria such as fairness or priority. Any component or device that is configured to ensure that only one primary can access any one of the secondary components at any given time is referred to herein as a system bus arbitrator. Various schemes such as weighted fairness can be implemented to improve the efficiency of secondary component access, but such schemes can increase system complexity and latency. In conventional implementations, a computer system includes a single system bus arbitrator for each bus in the computer system.

The techniques of the present invention contemplate having a streaming output device read values out of memory continuously in order to provide an output signal such as a waveform. However, by continuously reading data out of memory, the streaming output device uses substantial bus resources, in effect preventing a processor from communicating with other devices. The system bus 107 remains a significant bottleneck in systems using a cycle accurate streaming output device. In computer systems with high-performance components such as streaming output devices, many primary and secondary components perform various functions internal to the component quickly but end up waiting for bus access.

According to various embodiments of the present invention, it is recognized that a bus is no longer required in certain applications such as system on a chip, system on a programmable chip, and other computer system implementations. A device such as a programmable logic device (PLD) or a field programmable gate array (FPGA) using a hardware descriptor language (HDL) is herein referred to as a programmable chip. Instead of implementing complicated bus sharing schemes using mechanisms such as splitting, the bus itself can be eliminated to improve system performance. According to specific embodiments, it is recognized that primary components and secondary components need not be routed through a construct such as a bus. By not routing signals through a bus, a streaming output device can be implemented in a much more efficient manner. The conventional data and address lines that make up the bus are no longer the resource in contention. Instead, secondary components are resources in contention, as the number of physical lines connected to each secondary component in a system can be fixed.

Consequently, a system bus arbitrator associated with all the secondary components in a computer system is no longer needed. Instead, secondary components themselves that may be accessed by more than one primary component are assigned individual secondary side arbitrators. An arbitrator that corresponds to a specific secondary component accessible by more than one primary component is referred to herein as a secondary side arbitrator. In one embodiment, there is a secondary side arbitrator for each secondary component in a computer system. In other embodiments, there is a secondary side arbitrator for selected secondary components in a system. A component such as a streaming output device can continuously access system memory without preventing a processor from interacting with other devices.

Figure 3:
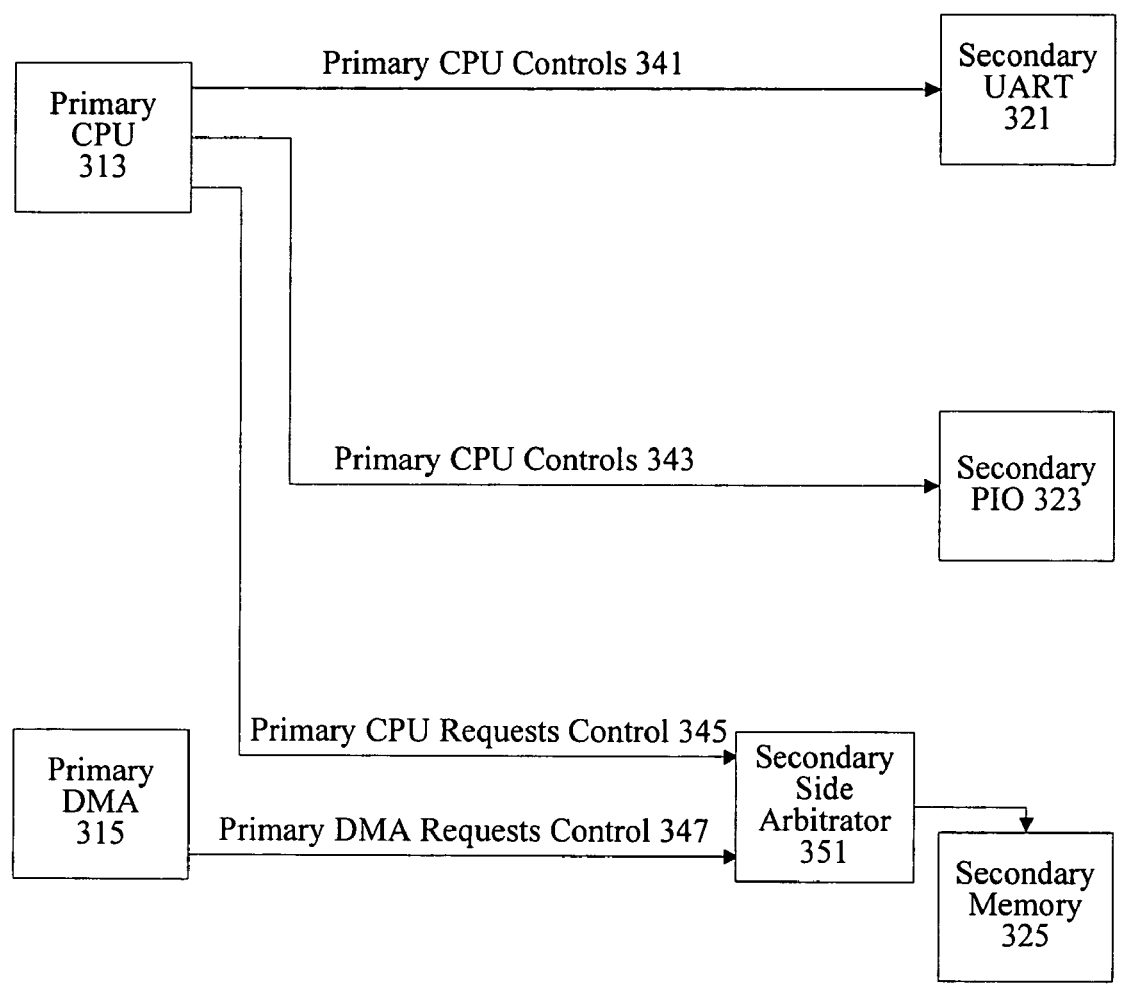
FIG. 3 is a diagrammatic representation showing a system having simultaneous multiple primary components.

FIG. 3 is a diagrammatic representation showing one example of a system using secondary side arbitration, sometimes referred to as slave side arbitration, simultaneous multiple primary components, or simultaneous multiple masters. A system using individual arbitrators that correspond to individual secondary components accessible by more than one primary component is referred to herein as a secondary side arbitration system. The secondary side arbitration system no longer requires a bus or a system bus arbitrator that prevents a second primary component from accessing a second secondary component when a first primary component is accessing a first secondary component. According to various embodiments a secondary component such as secondary memory 325 is associated with a secondary side arbitrator 351. However, secondary components UART 321 and PIO 323 are not associated with any arbitrator. In one example, secondary component UART 321 and secondary PIO 323 can only be accessed by primary CPU 313 and not by primary DMA 315. A secondary memory component 325, however, can be accessed by both primary CPU 313 and primary DMA 315.

According to various embodiments, a secondary side arbitrator 351 allows a first secondary component in a system to be accessed by a first primary component at the same time a second secondary component in the system is accessed by a second primary component. For example, secondary memory 325 can be accessed by primary DMA 315 through secondary side arbitrator 351 at the same time, secondary UART 321 is accessed by primary CPU 313.

By allowing a CPU to access a secondary component at the same time another primary component such as a streaming output device or an Ethernet component is accessing memory, bus bottlenecks can be reduced.

Figure 4:
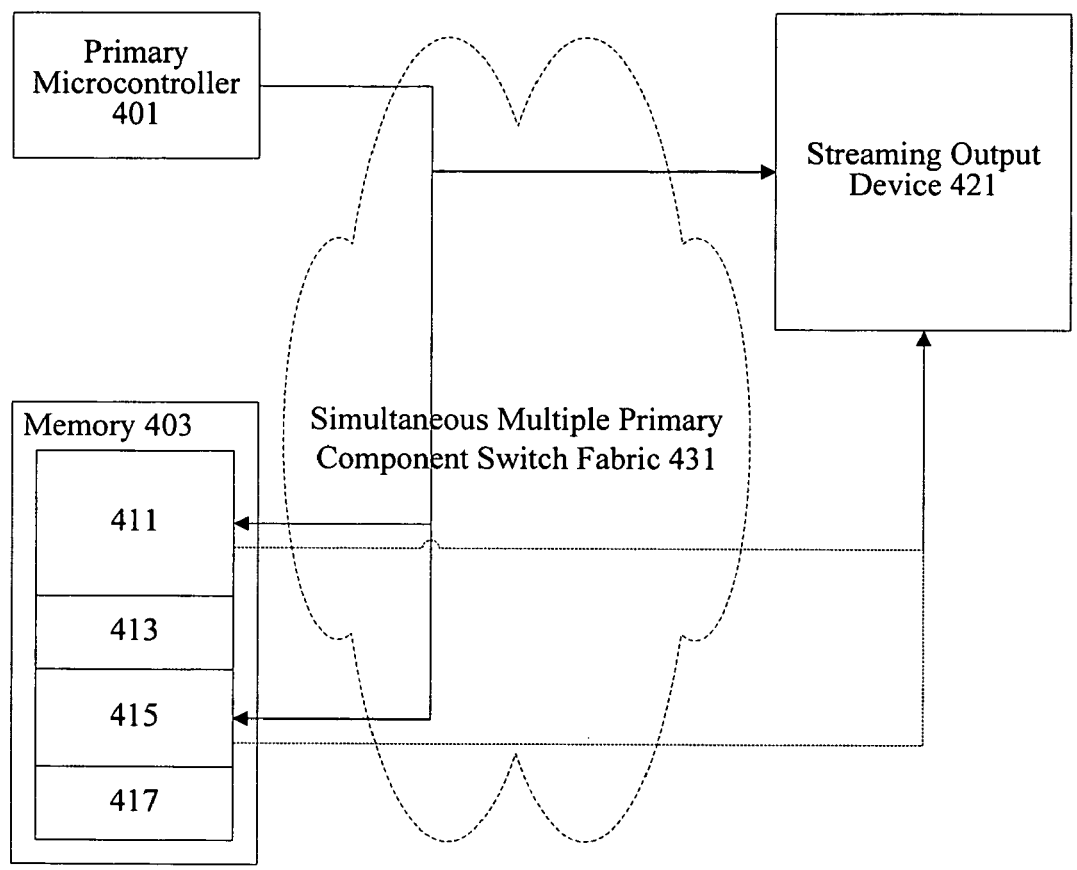
FIG. 4 is a diagrammatic representation showing a processor communicating with a streaming output device.

FIG. 4 is a diagrammatic representation showing one example interaction between a processor, memory, and a streaming output device. A primary microcontroller 401 is connected to streaming output device 421 and memory 403 through a simultaneous multiple primary component switch fabric 431. According to various embodiments, the simultaneous multiple primary component switch fabric 431 allows a primary component to interact with a secondary component while allowing other primary components to interact with other secondary components simultaneously. In one example, a microcontroller 401 is configured to write streaming output signal information to memory 403. Any data including discrete output signal values used to generate a streaming output such as a waveform is referred to herein as streaming output signal information. The streaming output signal information can be used to represent a variety of waveforms, such as uniform square waves or more randomized pulse sequences. Values can be written to various places in memory such as memory block 411 and memory block 415. A trigger signal is then written by the microcontroller 401 to the streaming output device 421 providing the streaming output device 421 with information on where to read the output waveform information and when to begin outputting the memory values.

The microcontroller 401 trigger signal can include timing information to indicate when the streaming output device 421 should begin reading the memory values. The trigger signal can also include information on whether the memory values should be read once or read in a periodic or some other predetermined or randomized manner. In one example, the streaming output device 421 can be configured as a digital to analog converter (DAC). The device 421 can be configured to automatically read a sequence of samples out of a memory buffer at regular intervals. Reading a sequence of samples in a periodic manner greatly simplifies the software interface because code can just write data into a buffer and tell the DAC to "play" the entire buffer with no further intervention.

In another example, the device 421 can be configured as a programmable edge generator. The device 421 can be configured to automatically read a sequence of edge transition times out of a memory buffer. The transition times can be read out either sequentially or be driven by some external source. In either event, the peripheral itself autonomously fetches samples out of the buffer until the buffer is empty. No microcontroller 401 intervention is required after the process is started. Other examples include streaming output devices configured as enhanced PIOs or PWMs, where the device can play back a sequence of its output bits or play back a sequence of duty cycles.

The output signal or output waveform of the streaming output device can be used by a variety of other components on a programmable chip or by components external to a programmable device. According to various embodiments, the streaming output device 421 includes buffering mechanisms to allow more uninterrupted reading of memory values. Address information provided by a microcontroller 401 can be actual addresses, offsets, or other information that can be used to locate output signal values provided by a microcontroller. Output signal value information can be provided in a memory in a variety of manners.

In one example, output signal values can be written to memory with timing information written to a streaming output device. In another example, output signal values and timing information can be written to memory with a simple trigger written to the streaming output device. FIGS. 5A and 5B show formats for output signal information written to memory.

FIG. 5A shows a 32-bit memory having address 501 and data 503 storing signal output values. A streaming output device is provided with memory address information such as memory address 0x0000 and reads data values begin at the particular address location. A streaming output device has information from a microcontroller indicating when it should stop reading a particular block of memory or when it should read values from a different memory location. Timing information is provided from a microcontroller to a streaming output device through a switch fabric.

FIG. 5B shows an alternative embodiment where a 32-bit memory having addresses 551 and data 553 stores both output values and timing information. In one example, every other memory address entry is timing information. A memory address 0x0000 may contain data while a memory address 0x0001 may correspond to timing information instructing a streaming output device to output the data output at a particular clock cycle. Similarly, 0x0002 may correspond to data while a memory address 0x0003 may correspond to timing information instructing a streaming output device to output the data output a certain number of clock cycles later. A variety of different data and timing information formats can be used.

Figure 6:
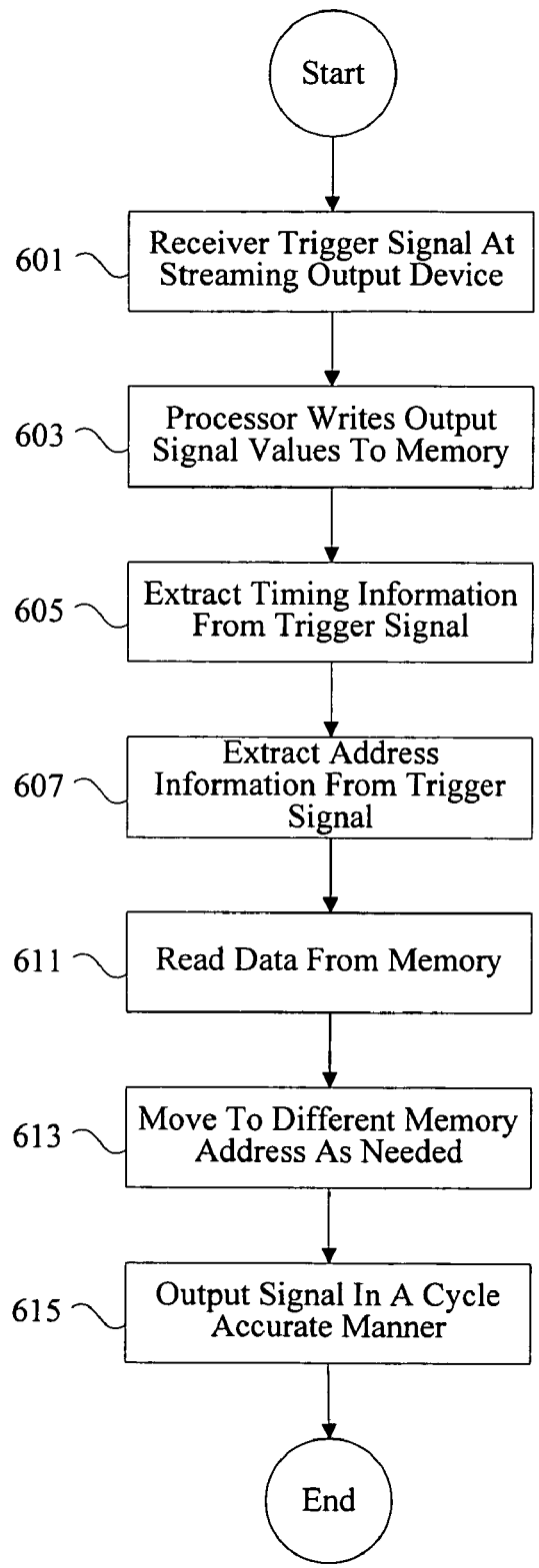
FIG. 6 is a flow process diagram diagrammatic representation showing a technique for generating a waveform.

FIG. 6 is a flow process diagram showing one technique for generating an output signal. At 601, the streaming output device receives a trigger signal. According to various embodiments, the trigger signal includes address and timing information instructing the streaming output device on how to obtain data from memory. In some embodiments, the trigger signal includes only address information and a start time for the streaming output device to begin pulling data. In other examples, the trigger signal includes multiple addresses and/or multiple offsets with integrated timing information providing detailed instructions on how to obtain and output the data. The timing information may instruct the streaming output device on how to generate future signals as well. Multiple addresses may be provided to delineate multiple blocks of memory used to store output signal values. At 603, a microcontroller or a processor begins populating memory with output signal values.

In some examples, data values corresponding to desired output signal values are written to address portions associated with the address information provided to a streaming output device. At 605, the streaming output device extracts timing information from the trigger signal received. In one embodiment, the timing information is merely a start time or indication to start at a particular clock cycle. At 607, memory address information is extracted. Using the address and timing information, data is pulled from memory at 611. In some examples, and data is continuously pulled with the aid of buffering mechanisms associated with a streaming output device. At 613, the streaming output device may be pulled from different addresses in memory as needed based on address information provided by the microcontroller or the processor. At 615, output signal values are continuously provided in a cycle accurate manner. For example, signal output values can be provided continuously during consecutive clock cycles. An edge configured for output after 4 cycles would be output after 4 cycles. The streaming output device can accomplish cycle accurate output of signal values without processor intervention.

Figure 7:
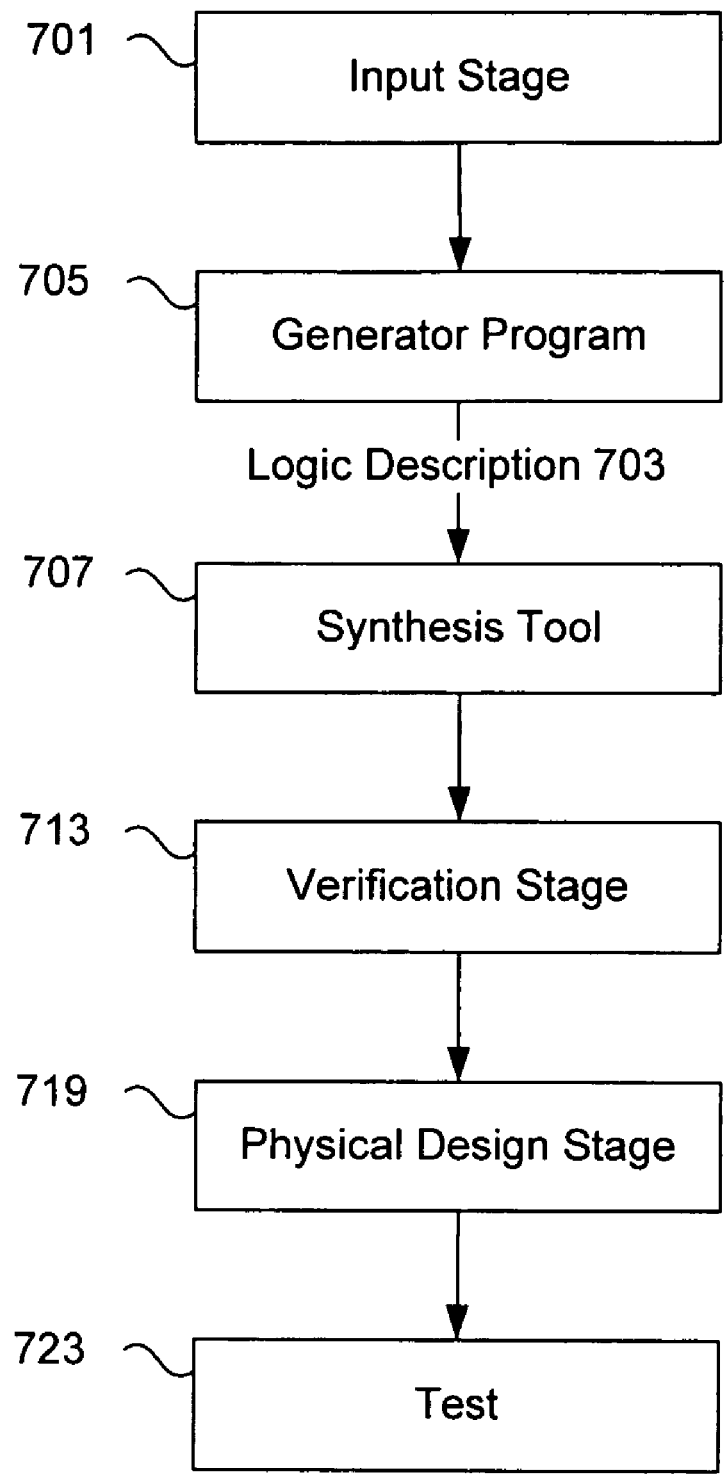
FIG. 7 is a diagrammatic representation showing implementation of a programmable chip.

FIG. 7 is a diagrammatic representation showing implementation of an electronic device that can have a streaming output device. An input stage 701 receives selection information typically from a user for logic such as a processor core as well as other components such as a streaming output device to be implemented on an electronic device. A generator program 705 creates a logic description and provides the logic description along with other customized logic to any of a variety of synthesis tools, place and route programs, and logic configuration tools to allow a logic description to be implemented on an electronic device.

In one example, an input stage 701 often allows selection and parameterization of components to be used on an electronic device. In some examples, components provided to an input stage include intellectual property functions, megafunctions, and intellectual property cores. The input stage 701 may be a graphical user interface using wizards for allowing efficient or convenient entry of information. The input stage may also be a text interface or a program reading a data file such as a spreadsheet, database table, or schematic to acquire selection information. The input stage 701 produces an output containing information about the various modules selected.

In typical implementations, the generator program 705 can identify the selections and generate a logic description with information for implementing the various modules. The generator program 705 can be a Perl script creating HDL files such as Verilog, Abel, VHDL, and AHDL files from the module information entered by a user. According to various embodiments, the generator program 705 also provides information to a synthesis tool 707 to allow HDL files to be automatically synthesized. In some examples, a logic description is provided directly by a designer. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool 709.

As will be appreciated by one of skill in the art, the input stage 701, generator program 705, and synthesis tool 707 can be separate programs. The interface between the separate programs can be a database file, a log, or simply messages transmitted between the programs. For example, instead of writing a file to storage, the input stage 701 can send messages directly to the generator program 705 to allow the generator program to create a logic description. Similarly, the generator program can provide information directly to the synthesis tool instead of writing HDL files. Similarly, input stage 701, generator program 705, and synthesis tool 707 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 707.

A synthesis tool 707 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 713 typically follows the synthesis stage 707. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 713, the synthesized netlist file can be provided to physical design tools 719 including place and route and configuration tools. A place and route tool typically locates logic cells on specific logic elements of a target hardware device and connects wires between the inputs and outputs of the various logic elements in accordance with logic required to implement an electronic design. The device can also be physically tested at 723.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 701, the generator program 705, the synthesis tool 707, the verification tools 713, and physical design tools 719 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 8:
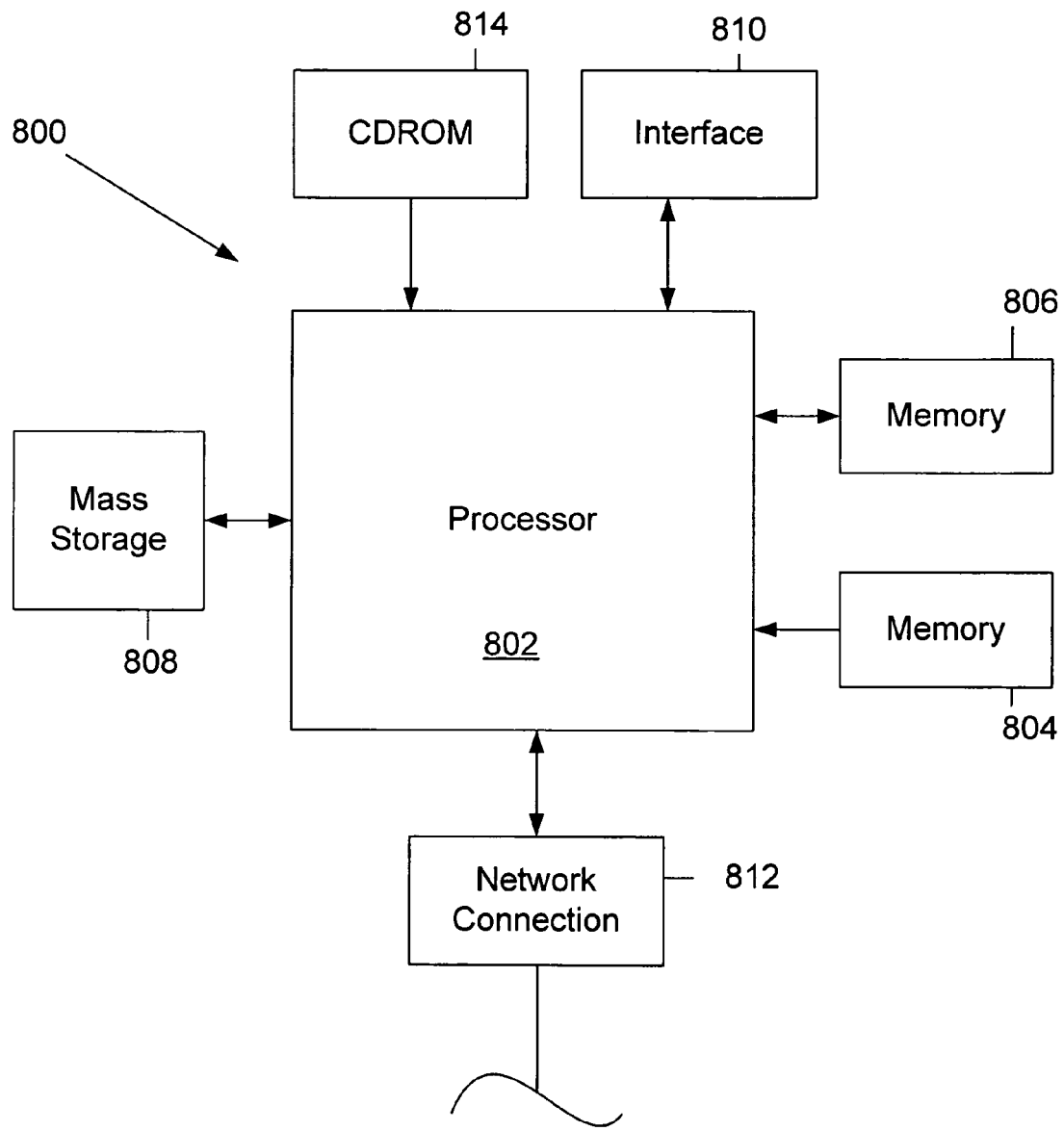
FIG. 8 is a diagrammatic representation of a system that can be used to implement the programmable chip.

FIG. 8 illustrates a typical computer system that can be used to implement a programmable chip having a streaming output device. The computer system 800 includes any number of processors 802 (also referred to as central processing units, or CPUs) that are coupled to devices including memory 806 (typically a random access memory, or "RAM"), memory 804 (typically a read only memory, or "ROM"). The processors 802 can be configured to generate a test sequences for any designated processor. As is well known in the art, memory 804 acts to transfer data and instructions uni-directionally to the CPU and memory 806 is used typically to transfer data and instructions in a bi-directional manner.

Both of these memory devices may include any suitable type of the computer-readable media described above. A mass storage device 808 is also coupled bi-directionally to CPU 802 and provides additional data storage capacity and may include any of the computer-readable media described above. The mass storage device 808 may be used to store programs, data and the like and is typically a secondary storage medium such as a hard disk that is slower than memory. The mass storage device 808 can be used to hold a library or database of prepackaged logic or intellectual property functions, as well as information on generating particular configurations. It will be appreciated that the information retained within the mass storage device 808, may, in appropriate cases, be incorporated in standard fashion as part of memory 806 as virtual memory. A specific mass storage device such as a CD-ROM 814 may also pass data uni-directionally to the CPU.

CPU 802 is also coupled to an interface 810 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 802 optionally may be coupled to a computer or telecommunications network using a network connection as shown generally at 812. With such a network connection, it is contemplated that the CPU might receive information from the network, or might output information to the network in the course of performing the above-described method steps. It should be noted that the system 800 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 808 or 814 and executed on CPU 808 in conjunction with primary memory 806.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of primary and secondary components and should not be restricted to the ones mentioned above. Although a streaming output device has been described in the context of a microcontroller and a simultaneous multiple primary component switch fabric, a streaming output device can be used in a system without a microcontroller and/or without a simultaneous multiple primary component switch fabric. It is therefore intended that the invention be interpreted to include all variations and equivalents that fall within the true spirit and scope of the present invention.

What is claimed is:

1. A system on a programmable chip, the system comprising:
   memory;
   a processor coupled to memory, the processor on the programmable chip, the processor operable to write streaming output information to memory;
   a streaming output peripheral on the programmable chip configured to generate clock cycle accurate output signals, wherein the clock cycle accurate output signals are generated by reading streaming output information from memory and outputting signals based on the streaming output information;
   wherein the memory, processor, and streaming output peripheral are connected to a simultaneous multiple primary component fabric, the simultaneous multiple primary component fabric allowing a first primary component access to a first secondary component at the same time a second primary component is accessing a second secondary component.

2. The system of claim 1, wherein the streaming output information includes amplitude and timing information.

3. The system of claim 1, wherein the streaming output information comprises a sequence of values written to memory.

4. The system of claim 3, wherein the sequence of values is associated with a periodic waveform.

5. The system of claim 3, wherein the sequence of values is associated with an event driven waveform.

6. The system of claim 3, wherein the sequence of values is associated with a scripted waveform.

7. The system of claim 1, wherein the streaming output peripheral operates as a streaming parallel output.

8. The system of claim 1, wherein the streaming output peripheral operates as a digital to analog converter (DAC).

9. The system of claim 1, wherein the streaming output peripheral operates as a pulse width modulator (PWM).

10. The system of claim 1, wherein clock cycle accurate output values are generated during expected clock cycles.

11. The system of claim 10, wherein clock cycle accurate output values form clock cycle accurate waveforms.

12. The system of claim 11, wherein the clock cycle accurate waveform is generated without intervention from the processor.

13. The system of claim 1, wherein the streaming output peripheral receives address information from the processor indicating where to read streaming output information.

14. The system of claim 13, wherein address information comprises one or more memory addresses.

15. The system of claim 1, wherein the memory, processor, and streaming output peripheral are connected using a simultaneous multiple primary component fabric.

16. A method for generating a waveform, the method comprising:
   reading streaming output information from memory, the streaming output information written to memory by a processor core on a programmable chip;
   generating clock cycle accurate output signals at a streaming output peripheral on the programmable chip, wherein the clock cycle accurate output signals are generated at the streaming output peripheral by reading streaming output information from memory and outputting signals based on the streaming output information;
   wherein the memory, processor core, and streaming output peripheral are connected to a simultaneous multiple primary component fabric, the simultaneous multiple primary component fabric allowing a first primary component access to a first secondary component at the same time a second primary component is accessing a second secondary component.

17. The method of claim 16, wherein the streaming output information includes amplitude and timing information.

18. The method of claim 16, wherein the streaming output information comprises a sequence of values written to memory.

19. The method of claim 18, wherein the sequence of values is associated with a periodic waveform.

20. The method of claim 18, wherein the sequence of values is associated with an event driven waveform.

21. The method of claim 18, wherein the sequence of values is associated with a scripted waveform.

22. An apparatus for generating a waveform, the apparatus comprising:
   means for reading streaming output information from memory, the streaming output information written to memory by a processor core on a programmable chip;
   means for generating clock cycle accurate output signals on the programmable chip, wherein the clock cycle accurate output signals are generated by reading streaming output information from memory and outputting signals based on the streaming output information;
   wherein the memory, processor core, and streaming output peripheral are connected to a simultaneous multiple primary component fabric, the simultaneous multiple primary component fabric allowing a first primary component access to a first secondary component at the same time a second primary component is accessing a second secondary component.

23. The method of claim 22, wherein the streaming output information includes amplitude and timing information.

24. The method of claim 22, wherein the streaming output information comprises a sequence of values written to memory.

25. The method of claim 24, wherein the sequence of values is associated with a periodic waveform.

* * * * *